United States Patent [19]

Rische et al.

[11] Patent Number: 4,731,536
[45] Date of Patent: Mar. 15, 1988

[54] APPARATUS FOR CHECKING PERSONS FOR RADIOACTIVE CONTAMINATION

[75] Inventors: Uwe W. Rische, Bendestorf; Rainer Gerlach, Wedel/Holst., both of Fed. Rep. of Germany

[73] Assignee: Firma Merfurth GmbH, Hamburg, Fed. Rep. of Germany

[21] Appl. No.: 828,065

[22] Filed: Feb. 10, 1986

[30] Foreign Application Priority Data

Feb. 18, 1985 [DE] Fed. Rep. of Germany ....... 3505527
Jun. 22, 1985 [EP] European Pat. Off. .......... 851077461

[51] Int. Cl.$^4$ ................................................ G01J 1/42
[52] U.S. Cl. ..................................... 250/394; 250/370
[58] Field of Search ................. 250/394, 358.1, 370 A

[56] References Cited

U.S. PATENT DOCUMENTS 4,352,019  9/1982  Pollard ................................ 250/394

FOREIGN PATENT DOCUMENTS 0060574  9/1982  European Pat. Off. ............ 250/394
1265878  4/1968  Fed. Rep. of Germany ...... 250/394
7515406  9/1975  Fed. Rep. of Germany ...... 290/394
2413027  9/1975  Fed. Rep. of Germany ...... 250/394
2311319  5/1976  France ................................ 250/394

OTHER PUBLICATIONS

Atompraxis-1968, pp. 338-344.
IPM7 Microprocessor Controlled Personnel Contamination Monitor, (pp. 1 through 8), Sep. 1982.

Primary Examiner—Carolyn E. Fields
Assistant Examiner—Richard Hanig
Attorney, Agent, or Firm—Toren, McGeady & Associates

[57] ABSTRACT

An apparatus for checking persons for radioactive contamination comprises at least two detector panels (1, 2), which are interconnected and extend at an angle to each other and are provided each with detectors on at least one broadside. Said detector panels define a space for accommodating a person to be checked. The apex of the angle defines a vertical axis of rotation for the detector panels, which are interconnected to form a subassembly. Resetting drive means are disposed between the axis of rotation and the rigid subassembly. A revolving door is provided in a lock chamber for checking persons for radioactive contamination. A tread surface is provided by a floor plate carrying a foot detector, which is disposed between the vertical detector panels when they are in position of rest.

12 Claims, 15 Drawing Figures

APPARATUS FOR CHECKING PERSONS FOR RADIOACTIVE CONTAMINATION

1. Field of the Invention

This invention relates to apparatus for checking persons for radioactive contamination, comprising detector pands, which are optionally divided in height and extend at an angle to each other and define a space, which is adapted to be occupied by a person to be checked.

2. Description of the Prior Art

In such contamination check chambers, the front and rear sides of a person are sensed and it is difficult to ensure that the measurements are taken at equal distances. When the measurements are taken in two positions of the person, the distances will be small and the sensitivity will be high.

It is known to provide contamination check chambers having lateral entrance and exit doors, which are also provided with detectors. Such chambers may be provided on the floor with detectors in areas on which the feet are to be placed. The doors involve a high structural expenditure and require a large space and the transit times are increased.

This disadvantage will be aggravated when two doors are controlled in such a manner that when one door has been opened the other door cannot be opened unless a contamination has not been detected.

Known apparatus for monitoring passenger traffic comprise a check chamber provided with two doors which are so controlled that after one door has been opened the other door cannot be opened when a contamination has been detected.

In a known arrangement, at least three stationary detector panels are arranged at an angle to each other in a top plan view. In such top plan view, two panels extend on opposite sides of a middle panel at an angle of an order of about 135°. Such a checking apparatus may be accommodated in a niche and may closely confine a person to be checked. But a disadvantage resides in that the measurements are taken at large distances at the corners formed between the outer detector panels, which extend at an angle to each other, and the middle detector panel. In said known arrangement the position of the person to be checked is not defined because there are only hand boxes for receiving the hands at the outer edges of the outer panels. The measurements taken on the front and rear sides of a person will not be consistent. But the invention is also applicable in another embodiment to such an angular configuration.

It is known to design apparatus for checking persons in consideration of a so-called reference figure, which is also known as an ICRP reference man. Under certain conditions reference figure has in a top plan view an elliptical contour having a major axis of 35 cm and a girth of 95 cm (ICRP).

It is an object of the invention to provide upright detector panels carrying surface-type detectors and extending at an angle to each other and so to arrange said detector panels that a large number of persons can walk through between the detector panels in a faster succession and to ensure that accurate results will be obtained by the checks whereas the expendture will be reduced.

In an apparatus for checking persons against radioactive contamination, that object is accomplished in that at least two detector panels, which are provided each with detectors on at least one broadside and extend at an angle to each other and include a space for accommodating a person to be checked, said detector panels extending at an angle to each other are rigidly interconnected to constitute a rigid subassembly, which is mounted for rotation about a vertical axis of rotation, and a resetting drive is connected to said rigid subassembly and comprises means for storing resetting energy as the rigid subassembly is rotated about said axis of rotation from an initial position in one sense and for expending said energy to reset the rigid subassembly to said initial position when said rigid subassembly has been released.

For certain purposes the angle included by the detector panels is or may be altered. This may be desirable when the detector panels are adapted to close and open a corridor. Set screws may be provided for holding the detector panels at a predetermined angle to each other at least for a certain time. A temporary adaptation may be effected by ratchet mechanism, which are operatively connected to the detector panels and limit the adjustment in a predetermined position and provide for a resetting. Such an arrangement will permit an adaptation to different reference figures. This may alternatively be accomplished by a mechanical detent or locking device or such device provided with adjusting magnets and/or with an adjusting drive so that an adaptation to a person to be checked can be effected within predetermined limits.

These features may be utilized in a special embodiment of the invention in which the detector panels extending at an angle to each other define an apex of the angle included by them and are interconnected at said apex by mounting means which permit said detector panels to be moved in alternation, said mounting means are provided with adjusting means, which are adapted to control the adjustment of two detector panels to a predetermined angle relative to each other, said mounting means are provided with ratchet means, which are operatively connected to two adjacent detector panels and limit the adjustment of the detector panels relative to each other to a certain degree and constitute resetting means for resetting the detector panels relative to each other to the predetermined angular position.

In preferred embodiments, a tread surface is disposed in the space included by the detector panels and is formed by a floor plate, which is provided with a foot detector structure having two detector units for respective feet. That tread surface is disposed in the space which is included by the rotatable detector panels when they are in a position of rest.

The at least two detector panels may be provided with mounting means, which are adjustable to change the angle which is included by adjacent detector panels. Said mounting means may be adjustable for adaptation to the contour of a reference figure. The at least two detector panels provided with detectors may be provided with connecting means including a hinge.

In a particularly preferred embodiment the apparatus comprises a plurality of detector panels, which extend at angles to each other and each of said detector panels is provided on both broadsides with detectors. Said detector panels are interconnected to form a rigid subassembly consisting of a revolving door, which is mounted for rotation about a vertical axis that is defined by the common apex of said angles. The detector panels constitute wings of the revolving door; means for locking and unlocking said door are provided between the rigid subassembly and its axis of rotation and means are provided for processing the output signals of the detectors and are connected by a functional link to the locking and unlocking means. Such an arrangement will permit a large number of successive persons to walk faster through the revolving door than is possible with a known arrangement. In such an embodiment the wings of the revolving door, particularly the detector panels which constitute such wings, are rigidly interconnected.

A special advantage afforded by such an embodiment that an air lock chamber can be formed between hot and cold spaces.

The term "rigid subassembly" used hereinbefore describes the subassembly during normal operation. The rigid subassembly may be provided with a ratchet mechanism, which is adapted to be unlocked so that the rigid interconnection can be eliminated in an emergency and the revolving door can then be unfolded to open an emergency passage.

Another desirable embodiment constitutes a walk-through check chamber, in which an axis of rotation is disposed. At least one wall defining the walk-through lock chamber is formed with a niche, in which an edge of a detector panel is pivotally movable. The detector panels extend at a fixed angle to each other and are mounted for rotation about the axis of rotation. A resetting mechanism is provided between the axis of rotation and the interconnected detector panels and includes springs means, which are arranged to store resetting energy when the detector panels are rotated to permit an exit of a person. When the detector panels have subsequently been released, the resetting mechanism expends said resetting energy to reset the detector panels to a position for receiving another person to be checked.

In such an embodiment the interconnected detector panels extending at an angle to each other are rotatable in unison. A ratchet mechanism is provided, which permits a rotation of the detector panels about the axis of rotation in one sense and only after a rotation in said sense through a predetermined angle permits a rotation in the opposite sense. Whereas the detector panels may be rotated in unison, individual wings of the subassembly comprising the detector panels may be moved individually, particularly for opening a passage in an emergency. The wings which consist of the detector panels are adapted to be locked relative to each other in a predetermined angular position and springs or similar resetting means are provided for automatically resetting said wings to said predetermined relative position.

In a desirable embodiment comprising only two detector panels for a check of one person at a time, said detector panels can be incorporated in a revolving door, which is mounted for rotation about a single axis of rotation, and ratchet mechanisms may be provided for angularly moving individual detector panels relative to each other as well as resetting means for resetting a wing of the revolving door to a predetermined initial angular position when said wing has been swung open to permit a checked person to leave.

A special embodiment constitutes a walkthrough check chamber, which is defined by two detector panels, which are mounted for rotation about an axis of rotation. Each detector panel is provided with detectors on that broadside which is remote from the wall which defines the walk-through lock chamber. The axis of rotation extends beside said wall.

In such an embodiment each of the two detector panels may be individually mounted to form a hinged door and the two detector panels are connected to a common control device, which causes said detector panels to be swung open in alternation and locks each detector panel in a closed position as the other detector panel is swung open. Locking means are provided for locking and unlocking the two detector panels in alternation.

In the above-described embodiment comprising means for locking and releasing the revolving door, that locking and releasing means may be releasable and may consist of two parts, which are adapted to be interlocked by interlocking means, which in one condition rigidly interconnect said two parts and in another condition eliminate said rigid interconnection so that the detector panels can then be swung as desired to open an exit in an emergency. The provision of the emergency exit is a particularly important feature, which is due to the fact that the locking means can be disabled so that the check chamber which in normal operation can be walked through only by one person at a time can be permanently opened in an emergency.

From that aspect the revolving door need not consist of only two wings, although that design is desirable. The subassembly constituted by the revolving door may consist of more than two detector panels. That subassembly is rotatably mounted and includes detector panels which are interconnected to constitute the wings of a revolving door. A mechanism comprising connecting means and resetting means is provided between the subassembly and the mounting means for the subassembly. Said mechanism is adapted to be unlocked and consists of two parts, which are adapted to be connected by interlocking means, which in one condition rigidly interconnect said parts and in another condition eliminate said rigid interconnection so that the detector panels can be rotated as desired to open an exit in an emergency. The term "unlocked" means that a rigid interconnection can be eliminated.

In another embodiment of the invention, one of the arrangements comprising individually movable detector panels and a set of interconnected detector panels is provided as well as mounting means by which said detector panels are mounted for rotation about an axis of rotation. Coupling means are provided, which are constituted by one of the parts of the group consisting of a resetting drive, resetting mechanism, control means, locking and unlocking means and connecting means, which coupling means are connected to at least one detector panel, on the one hand, and to one of the elements of the above-mentioned group, which also includes an additional detector panel, mounting means for detector panels and means defining the axis of rotation, and which coupling means are disengageable and when disengaged permit the detector panels to be freely pivotally movable relative to each other so as to open an emergency exit.

In the desirable embodiment only two interconnected vertical detector arrays are provided, which extend at an angle to each other. In such an embodiment the detector array is preferably divided in a central region of its width by a vertical blank strip, which is disposed in consideration of a reference figure, said vertical blank strips are arranged near those portions of the reference figure or of a person standing on the floor plate which are closest to the detector array. The foot detector structure suitably comprises two detector units for respective feet. The groups of detectors on either side of the vertical blank strip generate signals which can be processed to compensate the influence of the closest approximation of the detectors to the reference figure on the generation of said signals.

In that case fewer detectors will be sufficient and a simpler structure may be used than in known arrangements having a comparable measuring range. The small number of detector panels provided with surfacetype detectors will reduce the gaps in the horizontal measuring configuration so that more accurate results will be obtained with a simpler configuration. Because the detectors are spaced apart, the zero effect is reduced too. Besides, the peak sensitivity of the detectors in the central region of the width of each detector panel will not be disproportionately higher than the sensitivity in the remaining regions, so that a uniform sensitivity profile will be obtained with only two detector panels.

It is apparent from the above that said arrangement is designed in consideration of the reference figure and the angles. In dependence on a reference figure the angle included by the detector panels and the exact locations of the vertical blank strips of the detector panels, particularly in the central region of the width of each panel, can be adapted in such a manner that the vertical blank strip between adjacent detectors lies as exactly as possible in the region in which the detector panel most closely approximates the person to be checked.

Whereas the reference figure is a datum, that datum can differ in different geographical regions so that an adaptation will be desirable.

The optimum embodiment is designed for a reference figure which in a top plan view has an elliptical contour having a major axis of 35 cm and a girth of 95 cm and said embodiment comprises two detector panels having sensing surfaces which include an angle of an order of 104°.

Within the scope of the invention, underarm detectors may be combined with two detector arrays which extend at an angle to each other and are included in a rotatable subassembly. The provision of unterarm detectors is preferably to known hand boxes because the underarms and hands can be constrained to extend in said underarm boxes in predetermined directions so that the movements of the arm joints are restricted and the desired positioning of persons to be checked will be improved.

This wall be the case even when the person to be checked turns around so that his or her underarms are no longer in the checking boxes. Before the person has turned around, his or her position has been determined by the special arrangement and directions of the underarm boxes so that even when such person has turned around on the foot detector structure he or she will assume a position which is smaller to the position assumed before turning around.

In a preferred arrangement, the longitudinal axis of each detector in the underarm boxes is upwardly inclined from the entrance opening to the opposite end of the underarm box. Such an arrangement will facilitate the insertion of the underarms into the boxes. If two detectors are provided in each underarm box, the transverse axes of said detectors are suitably horizontal. The underarm boxes have suitably a length of about 50 cm.

The invention provides a check chamber which permits a check with results that are better than those obtained with known apparatus. The check chamber can be designed for a higher checking efficiency in that the rate at which persons can pass through the check chamber can be much increased. Just as the other embodiments, such an embodiment which comprises means for controlling the movements of the vertical detector arrays in alternation and means for driving and locking said arrays, permits said means to be unlocked so that an emergency exit can be opened. Even if the apparatus constitutes a check chamber, it may constitute a selfcontained subassembly which may be used in various ways.

If two detector panels are provided, the angle included by said panels lies suitably in a range between 90 and 118 degrees.

DETAILED DESCRIPTION OF THE PREFERRED EMBODIMENTS

The invention will now be explained with reference to illustrative embodiments shown on the diagrammatic drawing.

In all figures of the drawing, like parts are designated with the same reference characters.

Figure 1:
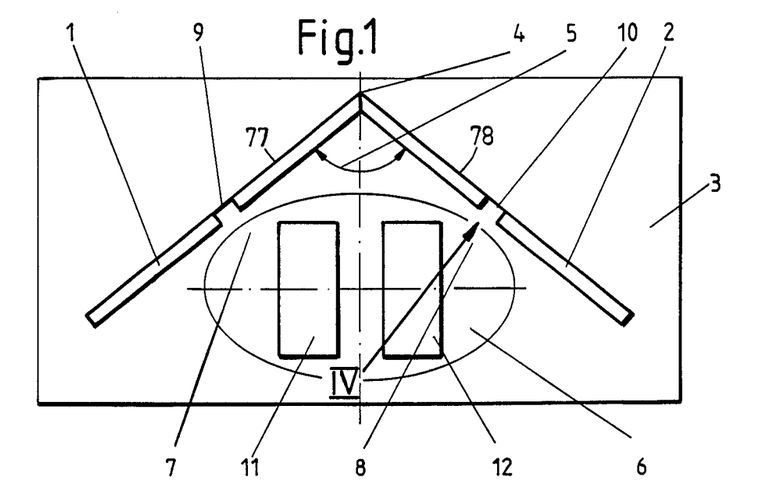
FIG. 1 is a top plan view showing an apparatus which comprises detector panels on which the detectors are separated by a vertical blank strip arranged in consideration of a reference figure.
Figure 2:
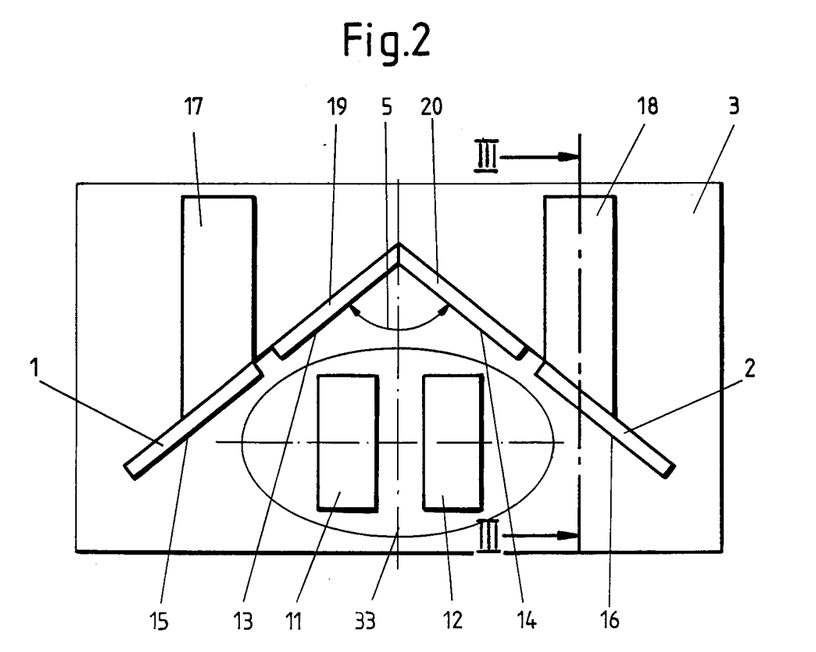
FIG. 2 is an elevation which is similar to FIG. 1 and shows an embodiment which is additionally provided with underarm boxes.

In the embodiments shown in top plan views in FIGS. 1 and 2, two detector panels 1, 2 are mounted on a floor surface or floor plate 3. The two detector panels 1, 2 are interconnected at 4 and extend at an angle 5 to each other, the value of which is of high significance in connection with the design of the detector panels. In the preferred embodiment, that angle amounts to 104° but the angle may be varied throughout the range defined hereinbefore. That angle is selected in consideration of a reference FIG. 6, which has an elliptical contour in a top plan view. It is apparent that the ellipse has peripheral portions 7, 8, which are closest to the detector panels 1, 2. Adjacent to the portions 7, 8 of the ellipse, the detector panels 1, 2 have vertical blank strips 9, 10 so that the sensitivity of the detector panels is reduced in that region and the result which is obtained by the measurement will agree with the actual conditions as closely as possible, i.e., it will be uniform and will have no superfluous minima. The blank strip is desirably disposed in the central region of the width of each detector panel. This arrangement will also determine the extent of said blank strip relative to the reference figure because the blank strip is disposed close to that portion of the reference figure which is closest to the detector panel.

The two detector panels 1, 2 are interconnected at 4 by conventional means. For instance, each panel comprises a carrying plate 77, or 78, which carries the detectors, which constitute radiation-sensitive surfaces or detector fields 13 to 16 (FIG. 2). The carrying plates 77, 78 may be integrally connected or may be welded to each other at 4 or may be interconnected by a hinge, which comprises interfitting sleeves and a rod extending through the sleeves. The blank strip 9 or 10 ensures that adjacent detector fields are spaced apart.

The design adopted in consideration of the reference figure is so selected that the flat radiationsensitive surfaces or detector fields 13, 14 or 15, 16 provided on the inside surfaces of the detector panels 1, 2 face each other on opposite sides of the angle 5.

In such an apparatus, a person stands with his or her feet on a foot detector structure, which may be divided into two detector units 11, 12. The foot detector structure constitutes a tread surface and its two detector units 11, 12 define the positions of respective feet.

Each of the two detector panels 1, 2 is provided in its upper portion with an underam box 17 or 18. The underarm boxes 17, 18 are parallel to each other and are so disposed relative to the blank strips 9, 10 that each underarm box 17 or 18 is close to that edge of the radiation-sensitive surface 13 or 14 of the inner detector 19 or 20 which adjoins the vertical blank strip 9 or 10.

Figure 3:
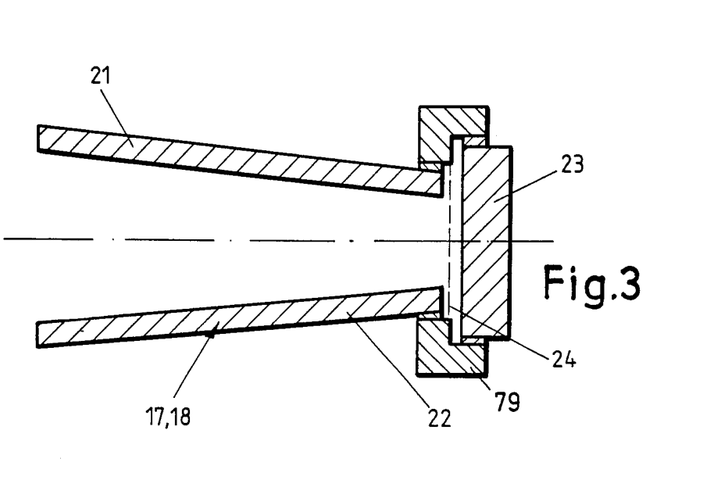
FIG. 3 is a sectional view taken on line III—III of FIG. 2.

It is apparent from FIG. 3 that each underarm box 17 or 18 is provided at its top and bottom with respective elongate, surface-type detectors 21, 22, which have a length corresponding to the total length of an underarm and of an extended hand. Said surface-type detectors converge toward those ends thereof which are remote from the associated panel 1 or 2. Adjacent to said remote ends of the surface-type detectors, the underarm boxes are provided with sensing means, such as proximity detectors 23 or photoelectric detectors 24, for a check whether the underarms have been introduced to an adequate depth.

The proximity detectors 23 are mounted in a frame 79, which is secured to the remote ends of the surfce-type detectors 21, 22. The elements which constitute a photodetector 24 may also be mounted on that frame.

Figure 4:
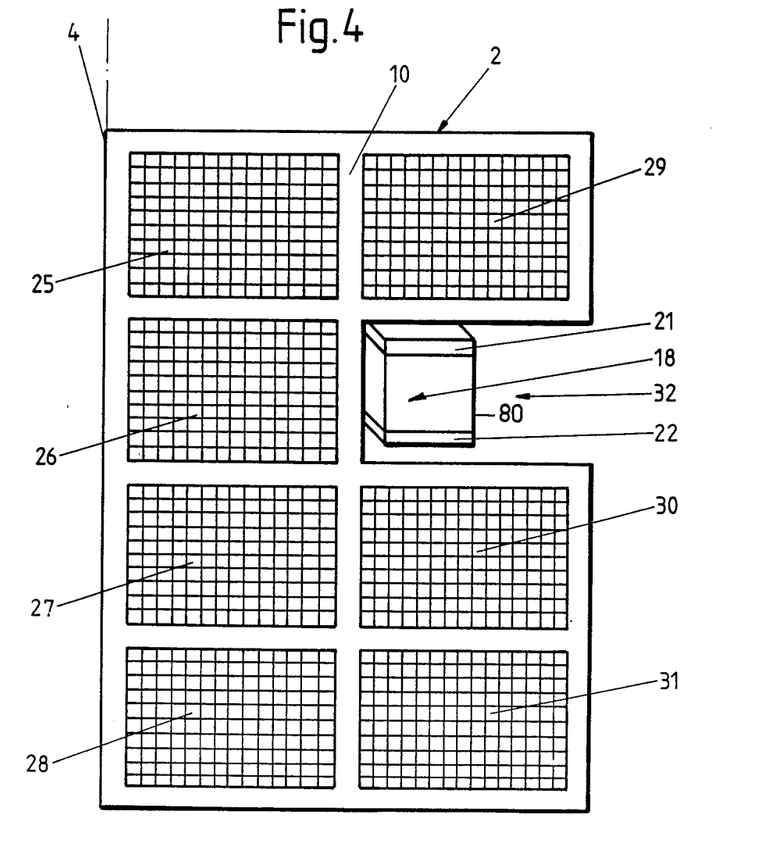
FIG. 4 is an elevation showing a detector panel as illustrated in FIGS. 1 or 2 and viewed in the direction of the arrow IV—IV in FIG. 1 and illustrates also the arrangement of the underarm boxes.

The structure of a detector panel 2 is apparent from the internal view shown in FIG. 4. The vertical blank strip 10 extends from top to bottom between the detector fields 25 to 28 and the detector fields 29 to 31. The detector panel has also horizontal blank strips, which separate the detectors or detector fields 25 to 31 from each other. Said rectangular surface-type detectors preferably have a vertical major axis. It is apparent from FIG. 4 that adjacent to the vertical joint 4 connecting the detector panel 2 to the other detector panel the detector panel 2 is provided with a vertical row of four vertically spaced apart detectors 25 to 28. On that side of the vertical blank strip 10 which is opposite to the joint 4 the detector panel 2 is provided with detector fields 29, 30 and 21, which are disposed adjacent to and parallel to the detector fields 25, 27 and 28, respectively. As a result, a blank area 32 beside the detector or detector field 26 is provided on the outside of the blank strip 10. An underarm box 18 is arranged in that blank area 32. In this region the body of the reference figure is not fully covered by the detectors. Owing to the provision of the underarm boxes, which extend at a distance from the center line 33, the introduction of the underarms into said boxes will result in such a constraint that optimum results will be obtained by the measurement.

The underarm boxes are connected to the carrying plates 77, 78 of the detector panels by means of a frame 80, which surrounds the surface-type detectors 21, 22. The arrangement of the detectors on the detector panel determines a certain elevation of the underarm boxes above the tread surface of the foot detector structure. That elevation may be selected as desired and will mainly be selected in consideration of an assumed height of the reference figure.

Figure 5:
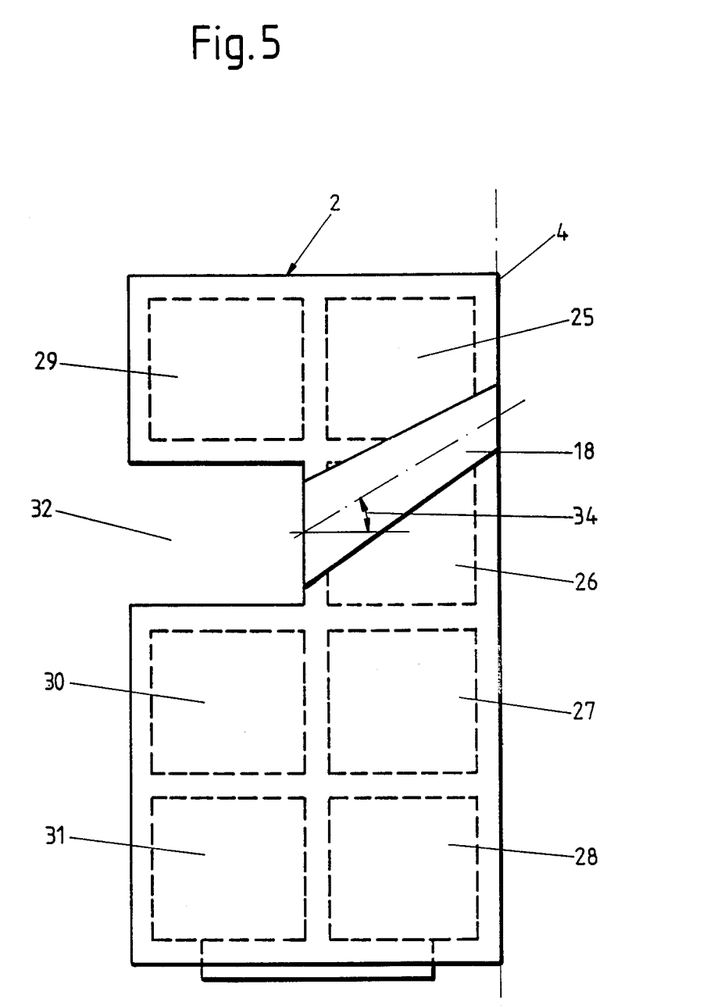
FIG. 5 is a said elevation showing the apparatus of FIG. 2 and illustrates the orientation of the underarm boxes.

FIG. 5 is an external elevation showing the checking apparatus of FIG. 1, particularly the detector panel 2. Optimum results will be obtained by the measurement if the underarm boxes 17, 18 include an angle of an order of 30° with the horizontal, although that angle may also be of a different order of magnitude. But it has been found that the provision of underarm boxes 17, 18 with such spacing from each other and with such upward inclination toward the hand end of the boxes will ensure that persons of ordinary height will assume an optimum position.

That optimum design will facilitate the introduction of the underarms so that changes from the desired position owing to a movement of the wrist joints will be prevented; such deviations may occur in known apparatus. In conjunction with the provision of only two detector panels, each of which has a vertical blank strip in the middle of its width, the described arrangement of the underarm boxes will facilitate the introduction of the underarms into the underarm boxes, and will cause the person to virtually spontaneously assume the desired position on the foot detector units 11, 12.

Regarding the arrangement and orientation of the underarm boxes 17, 18, these are only diagrammatically shown in FIG. 4 and in practice will be inclined and diverge from the detector panels. The underarm boxes are preferably secured to the detector panels 1, 2 to form a rigid unit therewith.

The drawing shows an advantageous embodiment of the underarm boxes, each of which may be provided with more than two surface-type detectors.

The term "rigid unit" also includes a unit comprising a pedestal, which carries the floor plate 3. In such "rigid unit" the two detector panels 1, 2 may extend at an angle to each other at least in condition for the measurement or at the time of measurement. The two detector panels may be pivotally movable in unison or may be interconnected by a hinge.

As described hereinbefore, such hinge may comprise alternate interfitting sleeves mounted on the carrying plates 77, 78 and a rod extending through the interfitting and aligned sleeves. Detent means may be provided for holding the detector panels in a selected position relative to each other.

Figure 6:
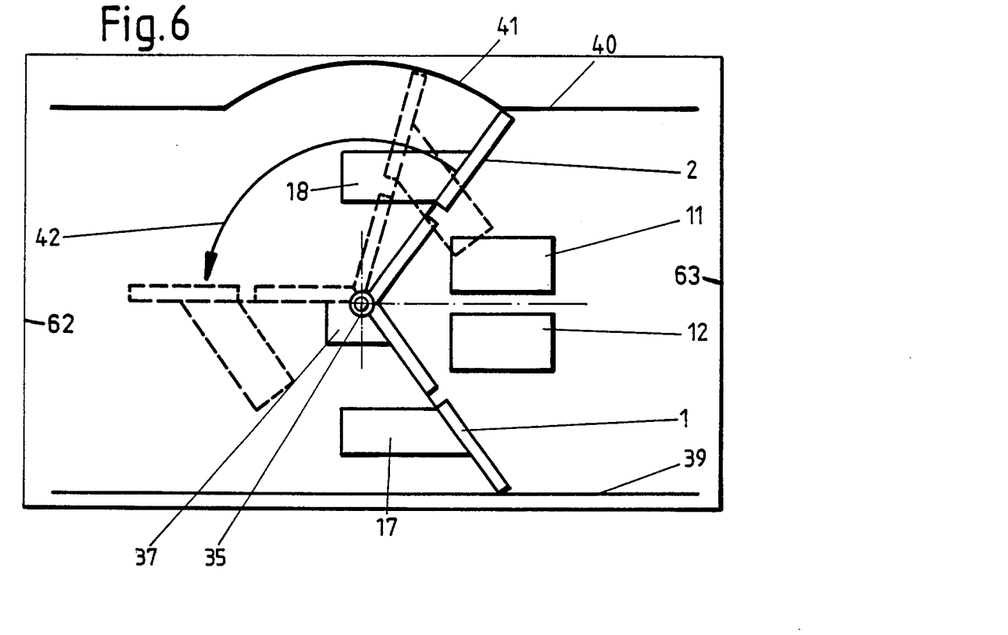
FIG. 6 is a top plan view showing a check chamber in accordance with the basic concept of the invention.
Figure 7:
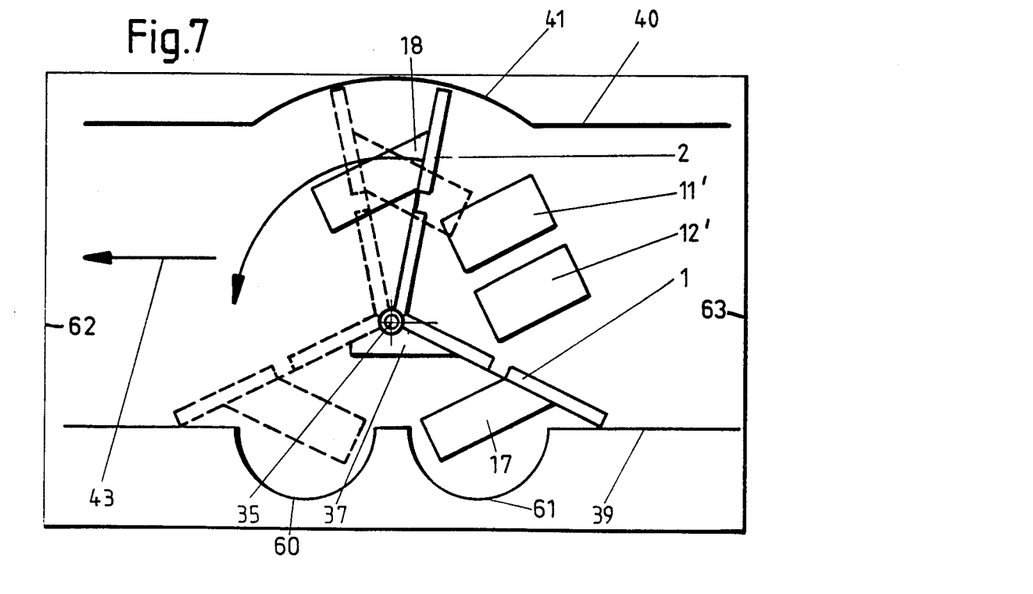
FIG. 7 is a top plan view which is similar to FIG. 6 and shows a modification.
Figure 9:
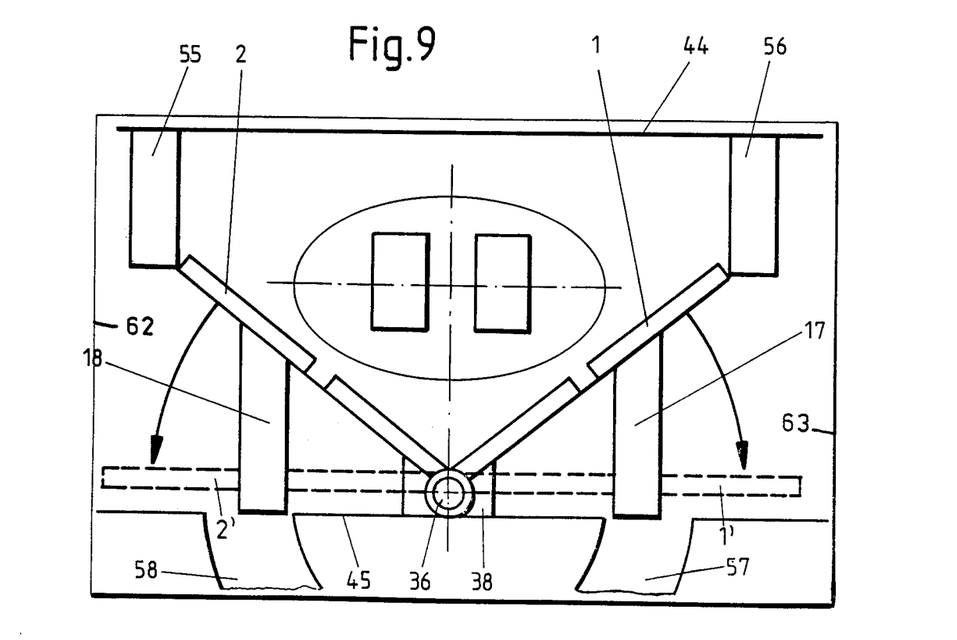
FIG. 9 is a top plan view showing a check chamber in a modification of FIG. 8.

Embodiments comprising hinge rods 35, 36 are shown in FIGS. 6, 7 and 9.

Detector panels 1, 2 which are hingedly interconnected are provided with hinge rods 35, 36, on which the detector panels are mounted and may be rotatably mounted by means of hinge sleeves. Each detector panel 1 or 2 may be connected to the hinge rods 35, 36 be bearings and/or by ratchet mechanisms 37, 38 permitting a movement only in one sense and, if desired, by a resetting mechanism, which may be similar to an automatic door closer. In a preferred embodiment the ratchet mechanisms comprise a resetting drive, which is adapted to store resetting energy. Attention in this regard is also directed to FIGS. 11 and 12.

Such ratchet mechanisms 37, 38 are vertically spaced apart along the height or axial length of the hinge rods 35, 36. The axis of the hinge rods 35, 36 obviously coincides with the apex of the angle at the joint 4.

The ratchet mechanisms may consist of commercially available mechanisms provided with resetting piston-cylinder units.

In the embodiment shown in FIGS. 6 and 7, the assembly including the two detector panels 1, 2 is disposed between walls 39, 40 and 41 of a corridor or a check chamber of an assembly which has boundary walls 62, 63 on a baseplate. The wall 39 is straight and continuous and the wall 40 has an arcuate portion 41, which permits a pivotal movement of the detector panel 2, which constitutes a wing of a revolving door.

In FIG. 6 the shutter consisting of a revolving door is shown with the two detector panels 1, 2 in an initial position relative to the center line of the foot detector units 11, 12, which are parallel to the center line of the check chamber. In that embodiment the detector panels 1, 2 are pivotally movable in the direction of the arrow 42 to such a position that a person who has been checked and has stepped back from the two detector units 11, 12 can proceed along the wall 39.

FIG. 7 illustrates a modification, in which the assembly comprising the detector panels 1, 2 is initially in a position in which said assembly is asymmetrical relative to the corridor extending in the direction of the arrow 43 so that the two detector units 11', 12' for receiving the feet extend at an oblique angle to the walking direction indicated by the arrow 43. In embodiments in which the detector panels are initially asymmetrical with respect to the corridor, the detector panel 59 may be pivotally moved to the position 59', i.e., as far as to the wall 39, so that the corridor will be closed also in that position and the person can more easily leave the check chamber after the check.

In that embodiment, the wall 39 is provided with arcuate niches 60, 61, which permit a pivotal movement of the underarm boxes 17, 18 and may be provided with optional sealing means, not shown.

Figure 8:
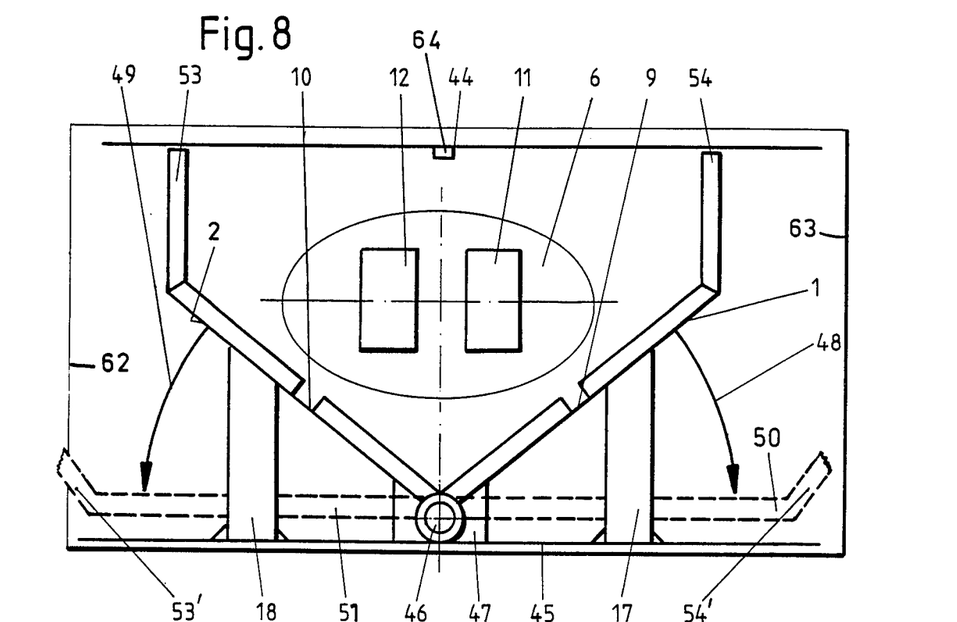
FIG. 8 is a top plan view showing a further embodiment of a check chamber in accordance with the invention.

FIG. 8 shows a walk-through chamber defined by parallel walls 44, 45. A vertical hinge rod 46 is mounted on the wall 45 and is incorporated in a hinge for connecting two detector panels 1, 2, which are provided with vertical blank strips 9, 10, respectively.

The vertical hinge rod 46 is provided with a housing for a controlling ratchet mechanism 47. That ratchet mechanism effects a mutual check or adjustment to ensure that the two detector panels 1, 2 can be pivotally moved only in alternation rather than simultaneously in the directions of the arrows 48, 49, respectively, to positions 50, 51 in which they open a passage. That interdependence may be ensured by a computer or by an opposing ratchet mechanism having a driving or releasing element which is controlled by means for interpreting the results of the measurement.

Two alternatives may be selected for the embodiment shown. In the illustrated embodiment, the two underarm boxes 17, 18 are secured to the wall 45, e.g., by means of brackets, which are mounted at the ends of the underarm boxes and are connected to the wall 45 by means of plugs. The underarm boxes 17, 18 may remain in their position owing to the blank area 32 shown in FIGS. 4 and 5. Nevertheless, a passage will be opened at least over one half of the spacing of the walls 44, 45 when a check has been completed or the next person is to be admitted.

That concept can particularly be adopted if vertical partitions 53, 54 are provided at the outer edges of the two detector panels 1, 2 and are movable to the positions 53' and 54' indicated by dotted lines. The partitions 53, 54 are secured to the carrying plates, e.g., by welding and preferably consist of plain walls although the partitions may also be provided with detector fields.

FIG. 9 shows an arrangement in which vertical walls 55, 56 are rigidly connected to the wall 44 and the outer vertical edges of the two vertical detector panels 1, 2 are pivotally movable past those side edges of the walls 55, 56 which are disposed near the center of the corridor. In that embodiment the underarm boxes 17, 18 are secured to the detector panels 1, 2 and the wall 45 is formed with preferably curved niches 57, 58 for receiving the two underarm boxes 17, 18 in alternation as one or the other of the two detector panels 1, 2 is pivotally moved about the rod 36 to the position designated 1' or 2', respectively.

In the embodiments shown in FIGS. 6 to 9. the ratchet mechanisms 37, 38 or the ratchet mechanism housing may be provided with means for effecting a release in an emergency. Such means may unlock the two detector panels 1 and 2 from the means holding said detector panels at a predetermined angle to each other so that the unlocked detector panels can be pivotally moved relative to each other to a position in which an emergency passage is opened between the walls of the check chamber. This may be accomplished with the aid of externally disposed control means, not shown, or by means of an emergency release lever 64 provided inside the check chamber, particularly between the detector panels 1, 2 when they are in their initial position (FIG. 8).

In the embodiments of the check chambers defined by the walls 39, 40 or 44, 45 and the walls 55, 56 attached thereto, the lateral boundary walls 62, 63 may be provided so that it is apparent that said embodiments preferably consist of self-contained assemblies which define a corridor. Such assemblies may be commercially available and can quickly be installed at a desired location. Such assemblies comprise the illustrated side walls, a floor and a ceiling as well as the detector panels 1 and 2 extending between the floor and the ceiling.

Figure 10:
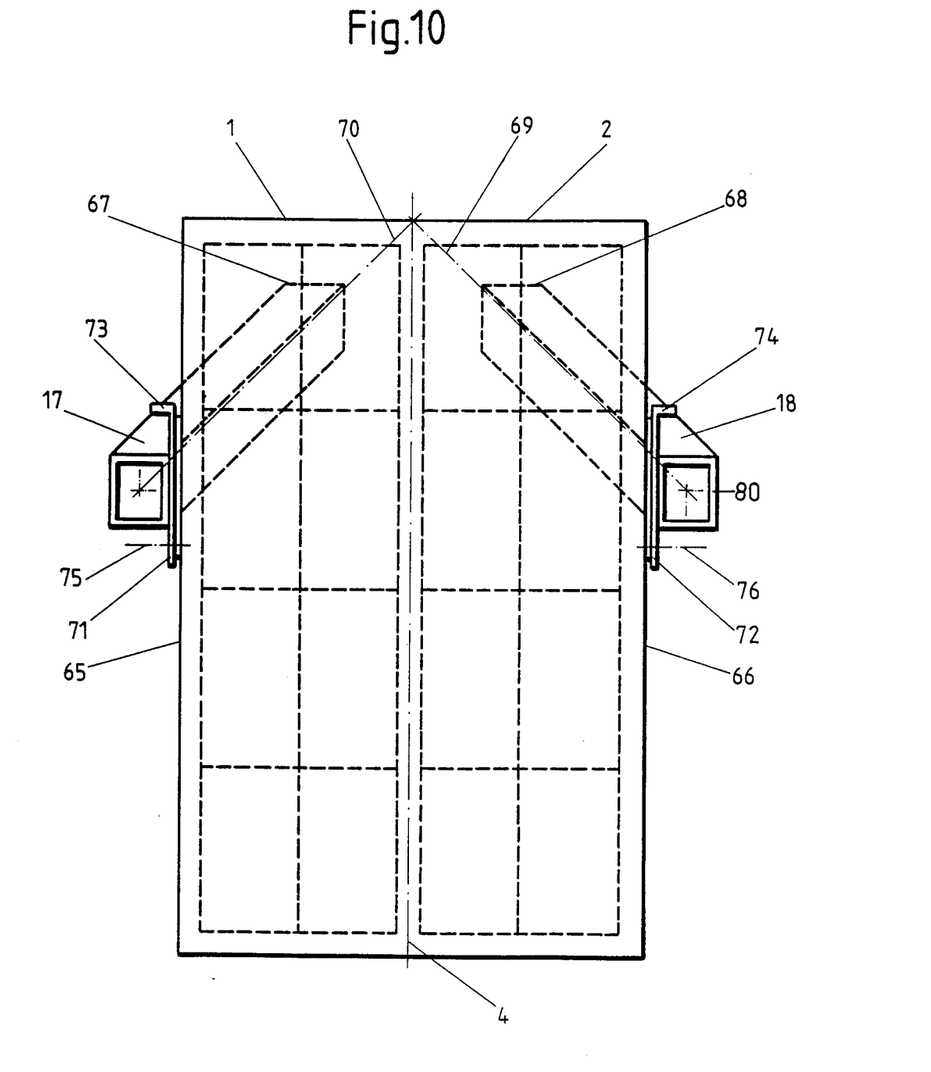
FIG. 10 is a front elevation showing two interconnected detector panels, which extend at an angle to each other and are provided with underarm boxes.

FIG. 10 is a front elevation showing two flat detector panels, which extend at an angle to each other and are provided with detector fields defined by dotted lines. The underarm boxes 17, 18 extend on the outside of the detector panels and are mounted at the outer edges 65, 66 thereof, e.g., on the carrying plates 77, 78 (FIGS. 1 and 2). The underarm boxes 17, 18 are connected to the carrying plates 77, 78 by adjusting means 71, 72 which are fixed to the carrying plates 77, 78 by fasteners 75, 76. Said fasteners may consist of screws so that the elevation of the underarm boxes 17, 18 can be altered if each carrying plate 77 or 78 has a plurality of vertically spaced apart holes for receiving such screw. The adjusting means 71, 72 permit also an adjustment of the inclination of the underarm boxes 17, 18. For this purpose, the adjusting means 71, 72 are provided with handles 73, 74. In accordance with FIG. 10 the underarm boxes 17, 18 are downwardly and inwardly inclined toward their inner ends 67, 68 so that the center lines 69, 70 of the underarm boxes 17, 18 intersect in a plane which bisects the angle 5 having the apex 4.

Only for the sake of clearness, the abovementioned bearing means and ratchet mechanisms will now be explained also in conjunction with control means.

Figure 11:
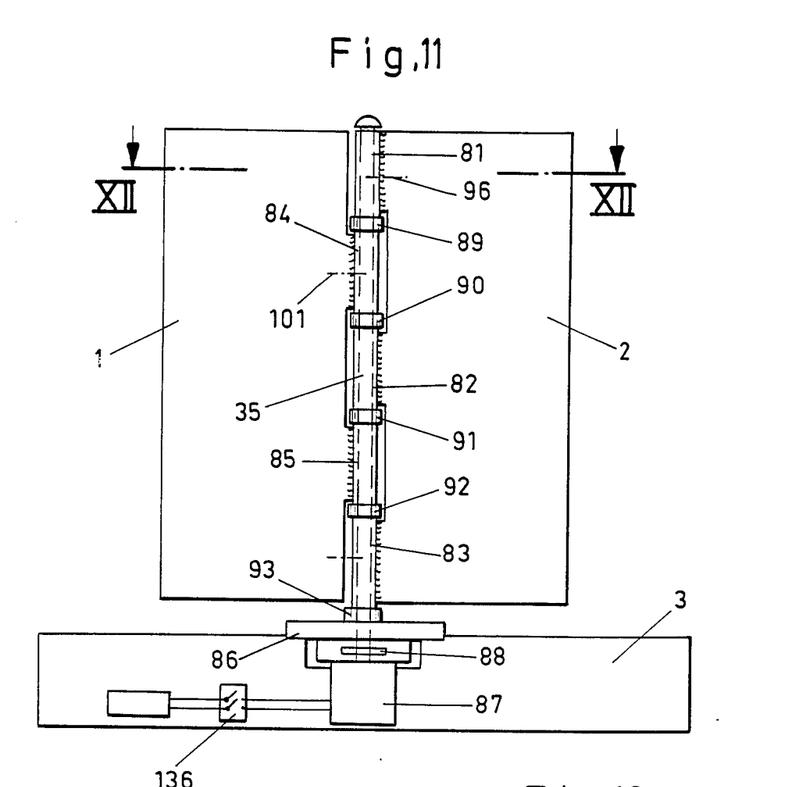
FIG. 11 is a front elevation showing an apparatus comprising two detector panels, mounting means for the detector panels, and drive means.

FIG. 11 shows how the two detector panels 1, 2 are pivoted on a hinge rod 35, which extends through the alternate interfitting sleeves 81 to 83 of the detector panel 2 and 84, 85 of the detector panel 1 and into a pedestal 86 mounted on the floor plate 3. A driving gearmotor 87 is mounted under the floor plate 3 and is coupled by coupling means 88 to the hinge rod 35. The motor 87 is connected to a power source by a switch 136, which is so designed in known manner that it can be actuated to determine for the motor 87 a desired sense of rotation or to reverse the rotation and to make and break the circuit. The motor 87 is adapted to rotate the hinge rod and to rotate the detector panels 1, 2 to a selected angular position relative to each other, in which the detector panels are locked by a detent mechanism such as is shown in FIG. 12.

Bearing rings 89 to 93 may be interposed between the sleeves 81 to 85.

Figure 12:
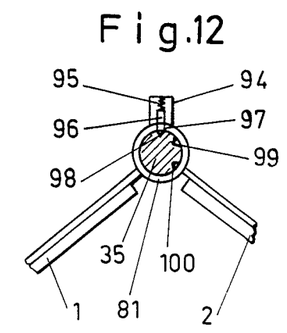
FIG. 12 is a sectional view taken on line XII—XII in FIG. 11.

FIG. 12 is a fragmentary sectional view taken on line XII—XII in FIG. 11. The hinge rod 35 and the sleeve 81 are apparent. The sleeve 81 is secured to the detector panel 2. A housing 94 is mounted on the sleeve 81 and contains a detent pin 96, which is biased by a spring 95 and extends through an opening 97 of the sleeve 81 and into a recess 98 formed in the hinge rod 85. That detent pin 96 can be retracted by hand so that it can be inserted into another detent recess 99 or 100 when the angular position of the detector panels relative to each other is to be altered. The detent recess may be so shallow that the detector panel 2 can be held in position relative to the hinge rod 35 but can be rotated about said rod 35 by a force which exceeds a threshold value that is determined by the detent mechanism and the spring 95. The detent pin 96 is only diagrammatically indicated in FIG. 11. At least one detent pin 101 is mounted on a sleeve 84 connected to the detector panel 1.

Because the detent mechanism can be disengaged, it constitutes a ratchet mechanism and the check chamber can be opened for an emergency.

Figure 13:
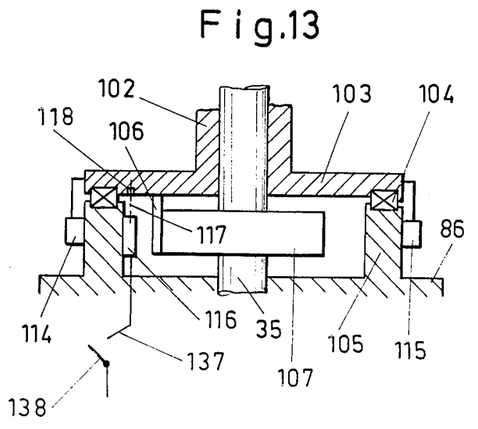
FIG. 13 is a fragmentary view showing the lower portion of an apparatus comprising two detector panels and a resetting drive.

FIG. 13 is a fragmentary view showing lower portions of the detector panels 1, 2, which in that embodiment are secured, e.g., to a common sleeve 102, which is rotatably mounted on the hinge rod 35. The sleeve 102 is provided at its lower end with a carrying flange 103, which is supported on a ring bearing 104, which is mounted on an upstanding cylindrical ring 105, which is mounted on the pedestal 86. A spiral spring 107 is disposed between an axial lug 106 depending from the sleeve 102 or from the carrying flange 103, on the one hand, and the hinge rod 35, which is fixed in the pedestal 86, on the other hand. That spiral spring 107 is strained as the detector panel assembly is rotated in one sense and is relaxed as it resets that assembly to its initial position. The end positions of said assembly are defined by stops 114, 115, which are disposed, e.g., between the carrying flange 103 and the cylindrical ring 105, and by at least one locking device, which consists, e.g., of an electromagnet provided with an armature 117, which is movable in response to an excitation of the electromagnet. When the detector panels are in one or the other of their end positions, said armature 117 can be moved into a recess 118 formed in the carrying flange, and the armature 117 can be moved out of the recess when the assembly is to be unlocked for a rotation.

The electromagnet is in conventional manner a separately excitable electromagnet comprising a coil and a diagrammatically indicated supply lead 137, which is connected by an excitation control switch 138 to a battery.

The switch 138 may be a two-pole switch.

The arrangement described just before constitutes a simple embodiment of a resetting drive provided with spring means and locking means.

Figure 14:
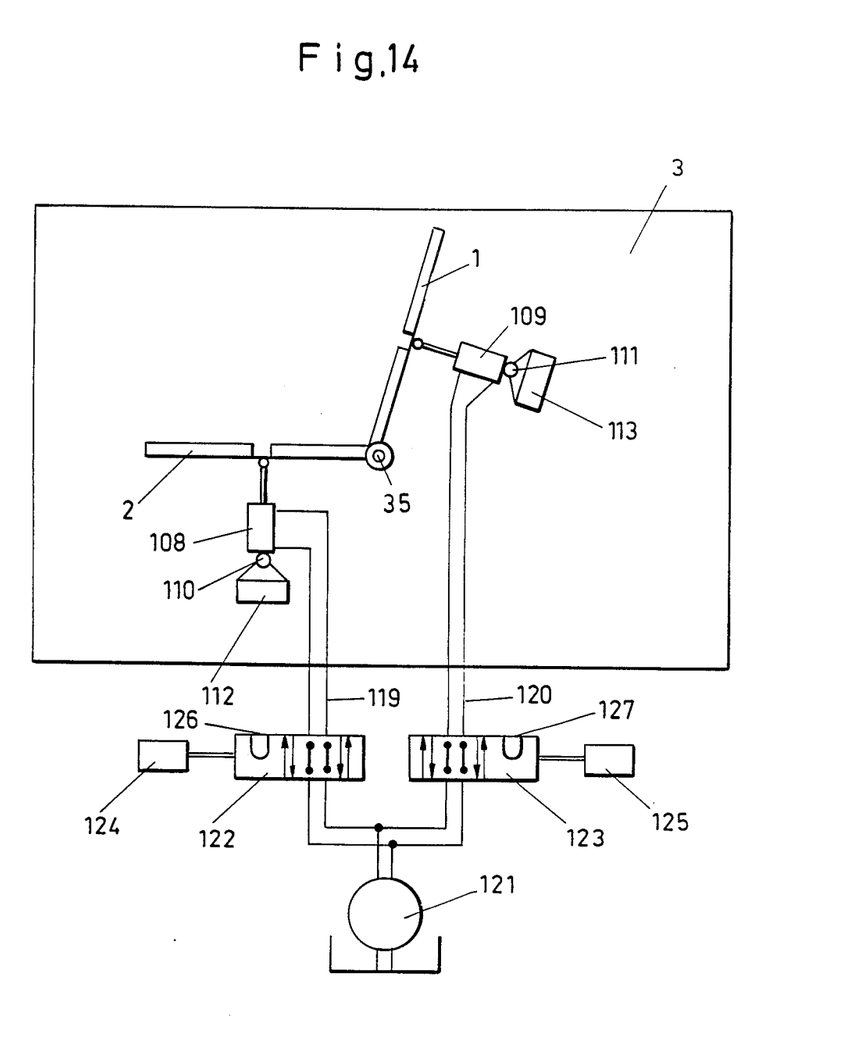
FIG. 14 is a fragmentary top plan view showing an apparatus comprising separate drive means for each detector panel.

Separate drive means for moving the detector panels 1, 2 are shown by way of example in FIG. 14. Each detector panel is individually movable about a hinge rod 35, on which the detector panel is mounted, e.g., by means of sleeves as shown in FIG. 11, and is hinged, e.g., at its lower end, to a drive 108 or 109, which is supported by hinges 110 or 111 to a bracket 112 or 113 mounted on the baseplate 3. Said drive means may consist of electromagnets having an extensible or retractable armature or may alternatively consist of hydraulic drive means provided with a telescopic piston. When selective or interdependent adjustments of the detector panels are desired, the drive means 108 and/or 109 are energized or actuated. If hydraulic drive means are provided, they are connected in hydraulic circuits 119, 120, which include a hydraulic pump 121, which can be selectively connected to one or the other of the hydraulic circuits and is operable in a sense corresponding to the desired direction of movement of the detector panel. The connection of the pump 121 to the hydraulic circuits 119, 120 is controlled by two known sliding valves 122, 123, which are actuated by actuating means 124, 125.

The means for driving the pump are not shown and are energized and deenergized, respectively, in response to a movement of the sliding valves 122, 123 to and from the positions for an operation of the detector panels in one sense or the other.

It is apparent that each sliding valve comprises grooves for a flow of the fluid in the various directions and is adjustable to a locking position and formed with a land 126 or 127 for disconnecting the hydraulic circuits 119, 120 so as to disable the drive means 108, 109, e.g., to permit the opening of an emergency exit.

Examples of detent or locking means, bearing means, ratchet mechanism and resetting means have thus been described and shown.

Figure 15:
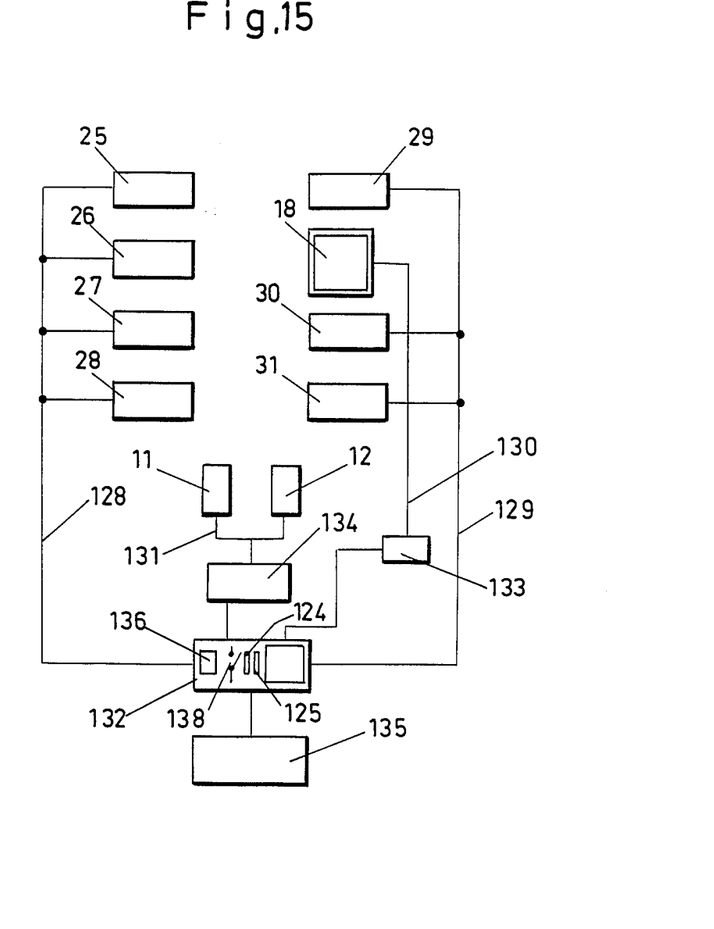
FIG. 15 is a block diagram.

FIG. 15 is a block diagram, from which the detector fields 25 to 31, the underarm box 18 (of FIG. 4) and the detector units 11, 12 of the foot detector structure of FIG. 1 are apparent. All detector fields or detectors are connected by lines 128, 129, 130 and 131 to a control subassembly 132. Each line 130 or 131 may incorporate monitoring and testing circuits 133, 134 for checking the operation of the connected detectors and for checking whether the underarms have been inserted to an adequate depth into each underarm box, such as 18.

The control subassembly 132 comprises also the control drives for controlling the drive means for effecting adjustments, the locking means, etc, such as are shown in FIGS. 11 to 14. Said control subassembly comprises a switch for turning on and off and reversing the gearmotor 87, the switch 138 controlling the excitation of the electromagnet 116, and switch means for the actuators 124, 125 for the sliding valves 122, 123 or for the circuits for exciting said actuators.

The control subassembly 132 is connected to a display 135 for indicating the results of the checks.

An example of a circuit arrangement for a different checking apparatus is shown in European Patent Application No. 0,060,574, from which the basic concept of the electric connections of the detector fields is apparent. In the apparatus in accordance with the invention, the circuitry includes also lines connected to the actuating means so that switching operations for initiating the operation of appropriate components of the apparatus will be performed in response to signals indicating predetermined values of certain parameters or input signals. Such signals may be generated in response to an actuation of limit switches or to the completion of the operation of timers.

We claim:

1. Apparatus for checking persons for radioactive contamination, wherein
    at least two detector panels (1, 2), which are provided each with detectors on at least one broadside and extend at an angle to each other and include a space for accommodating a person to be checked,
    said detector panels (1, 2) extending at an angle to each other are rigidly interconnected to constitute a rigid subassembly, which is mounted for rotation about a vertical axis of rotation (35, 36, 46), and
    a resetting drive is connected to said rigid subassembly and comprises means for storing resetting energy as the rigid subassembly is rotated about said axis of rotation from an initial position in one sense and for expending said energy to reset the rigid subassembly to said initial position when said rigid subassembly has been released.

2. Apparatus according to claim 1, wherein the detector panels extending at an angle to each other define an apex of the angle included by them and are interconnected at said apex by mounting means which permit said detector panels to be moved in alternation, said mounting means are provided with adjusting means, which control the adjustment of two detector panels to a predetermined angle relative to each other, said mounting means are provided with ratchet means (37, 38), which are operatively connected to two adjacent detector panels and limit the adjustment of the detector panels relative to each other to a certain degree and constitute resetting means for resetting the detector panels relative to each other to a predetermined angular position.

3. Apparatus according to claim 1, wherein a tread surface is disposed in the space included by the detector penels (1, 2) and is formed by a floor plate (3), which is provided with a foot detector structure having two detector units (11, 12) for respective feet.

4. Apparatus according to claim 1, wherein said at least two detector panels (1, 2) are provided with mounting means, which are adjustable to change the angle which is included by adjacent detector panels, said mounting means are adjustable for adaptation to the contour of a reference figure, and at least two detector panels which carry detectors provided with connecting means including a hinge.

5. Apparatus according to claim 1, wherein a plurality of detector panels (1, 2) are provided, each of said detector panels is provided on both broadsides with detectors, said detector panels are interconnected to form a rigid subassembly consisting of a revolving door, which is mounted for rotation about said vertical axis (36, 46), the detector panels constitute wings of the revolving door, means for locking and unlocking said door are provided between the rigid subassembly and said axis of rotation (36, 46), and means are provided for processing the output signals of the detectors and are connected by a functional link to the locking and unlocking means.

6. Apparatus according to claim 1, which provides a walk-through check chamber (FIGS. 6 and 7), in which an axis of rotation (35) is disposed, at least one wall (40) defining the walk-through check chamber is formed with a niche (41), in which an edge of a detector panel (2) is pivotally movable, the detector panels (1, 2) extend at a fixed angle to each other and are mounted for rotation about the axis of rotation (35), a resetting mechanism (37, 38) is provided between the axis of rotation and the interconnected detector panels and includes spring means, which are arranged to store resetting energy when the detector panels are rotated to permit an exit of a person, and when the detector panels have subsequently been released the resetting mechanism is arranged to use said resetting energy to reset the detector panels to a position for receiving another person to be checked.

7. Apparatus according to claim 1, which provides a walk-through check chamber (FIGS. 8 and 9), in which an axis of rotation is disposed, two detector panels (1, 2) are mounted for rotation about said axis of rotation (36, 46) each of said detector panels is provided with detectors on that broadside which is opposite to the wall defining the walk-through check chamber, the axis of rotation (36, 46) is disposed beside said wall, each detector panel (1, 2) constitutes a hinged door, which is individually movable, common control means (47) are operatively connected to both detector panels and operable to swing open the detector panels (1, 2) in alternation and to lock each detector panel (2, 1) when the other is swung out, and locking means are provided for controlling the locking and unlocking of the two detector panels in alternation.

8. Apparatus according to claim 5, characterized in that the means for locking and unlocking the revolving door are releasable and consist of two parts, which are interlockable by interlocking means, which in one condition rigidly interconnect said two parts and in another condition eliminate said rigid interconnection so that the detector panels (1, 2) can then be swung as desired to open an exit in an emergency.

9. Apparatus according to claim 5, wherein a subassembly comprising a plurality of detector panels (1, 2) is rotatably mounted and includes detector panels (1, 2) which are interconnected to constitute the wings of a revolving door, a mechanism means comprising connecting means and resetting means is provided between the subassembly and mounting means for the subassembly and is for unlocking and consists of two parts, which are connectable by interlocking means, which in one condition rigidly interconnect said parts and in another condition eliminate said rigid interconnection so that the detector panels (1, 2) can be rotated as desired to open an exit in an emergency.

10. Apparatus according to claim 1, wherein individually movable detector panels or a set of interconnected detector panels is provided as well as mounting means by which said detector panels are mounted for rotation about an axis of rotation, coupling means are provided, which are constituted by one of the parts of a group consisting of a resetting drive, resetting mechanism (37, 38), control means (47) locking and unlocking means and connecting means, which coupling means are connected to at least one detector panel (1, 2), and to one of the parts of the said group, which also includes an additional detector panel, mounting means for detector panels and means defining the axis of rotation, and which coupling means are disengageable and when disengaged permit the detector panels (1, 2) to be freely pivotally movable relative to each other so as to open an emergency exit.

11. Apparatus according to claim 2, wherein two interconnected vertical detector panels (1, 2) are provided, which extend at an angle to each other and carry the detectors on the broadsides facing each other across the angle, and adjacent detectors on each detector panel are separated by a vertical blank strip (9, 10), which is disposed in consideration of a reference figure, said vertical blank strips (9,10) are arranged near those portions of the reference figure or of a person standing on the floor plate which are closest to the detector panel.

12. Apparatus according to claim 11, wherein the angle between the two detector panels (1, 2) lies in the range from 90 to 118 degrees.

* * * * *

UNITED STATES PATENT AND TRADEMARK OFFICE
CERTIFICATE OF CORRECTION

PATENT NO. : 4,731,536
DATED : March 15, 1988
INVENTOR(S) : Uwe W. Rische et al

It is certified that error appears in the above-identified patent and that said Letters Patent is hereby corrected as shown below:

On the Title Page, Item [73] should read:

[73] Assignee: Firma Herfurth GmbH

Signed and Sealed this

Twenty-sixth Day of July, 1988

Attest:

DONALD J. QUIGG

Attesting Officer      Commissioner of Patents and Trademarks